Nov. 6, 1962     C. O. DAVIS ET AL     3,062,147
IGNITER FOR SOLID PROPELLANT GRAINS
Filed Sept. 28, 1959
FIG. 1
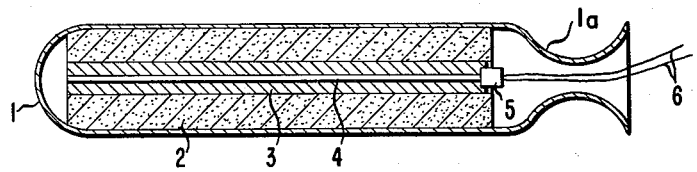
FIG. 2    FIG. 3    FIG. 4    FIG. 5
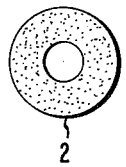 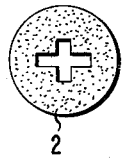 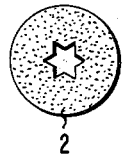 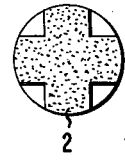
FIG. 6
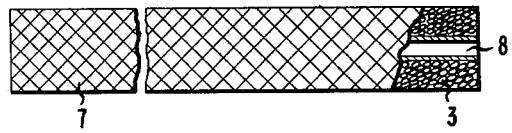
FIG. 7
INVENTORS
CLYDE OLIVER DAVIS
GEORGE ADELBERT NODDIN
BY *Thos. A. Wilson*
ATTORNEY United States Patent Office 3,062,147
Patented Nov. 6, 1962

3,062,147
IGNITER FOR SOLID PROPELLANT GRAINS
Clyde Oliver Davis, Wenonah, and George Adelbert Noddin, Sewell, N.J., assignors to E. I. du Pont de Nemours and Company, Wilmington, Del., a corporation of Delaware
Filed Sept. 28, 1959, Ser. No. 842,738
6 Claims. (Cl. 102—70)

The present invention relates to an ignition assembly. More particularly, this invention relates to an ignition assembly for solid propellent grains. This application is a continuation-in-part of our application, Serial No. 608,591, filed September 7, 1956, now abandoned.

Rockets used for artillery purposes, as missiles, both guided and unguided, as airplane take-off assists, and as boosters, generally have a solid propellent grain as the energy source to provide the thrust required to propel the rocket. The propellent grain consists essentially of an oxidizing agent and a reducing agent which react to form gaseous products by an exothermic process. The oxidizing agent and reducing agent may together form a single molecule or they may be separate compounds mixed together in the proper proportions. The rate of reaction, and, correspondingly, the thrust of the rocket, are dependent upon the composition of the propellent charge, the surface area of the charge available for simultaneous reaction, and the effectiveness of the initiation of the charge.

In most applications, the propellent grain is in the form of an unrestricted grain, i.e., a grain configuration wherein internal and/or external surfaces are provided in addition to the end surfaces of the grain to increase the total surface available for simultaneous reaction and, thereby, increase the instantaneous pressure and thrust provided by the charge. In the solid propellent field, the term "grain" is used to refer to any single mass of propellent which may be pressed, extruded, or cast in one piece or may consist of a number of units assembled to produce the single mass. Thus, a "grain" may be many thousands of pounds. The propellent grain must be one which will react with sufficient rapidity to provide the pressure required to produce the desired thrust but which will not detonate under the pressures and temperatures encountered within the motor casing. A wide range of compositions may be used, such as, for example, those previously used as propellants for cannon such as smokeless powder, cordite (smokeless powder-nitroglycerin), and gun powder (black powder), or mixtures of inorganic oxidizing agents such as inorganic nitrates, chlorates, or perchlorates, and reductants such as resins, nitro compounds, asphalt, sulfur, and carbon. The composition is initiated by an igniter. In smaller rockets, the igniter may consist of only an electric squib whereas in the larger rocket the igniter consists of an electric squib in combination with a readily ignitable, high temperature-producing material, for example, black powder and incendiary mixtures such as powdered aluminum or magnesium and potassium chlorate. The igniter transfers heat to the surface of the propellent composition and raises that surface to the ignition temperature. Typical ignition times from application of a firing current to ignition of a portion of the propellent grain are from 20 to 30 milliseconds. By positioning the igniter at the end of the grain opposite the nozzle, the flame and hot gases produced by the reaction of the grain sweep past the internal and/or external longitudinal surfaces of the propellent grain, thus igniting these surfaces. Until such time as the entire surface is reacting, the rocket motor cannot develop its full thrust. The time required for the ignition of the entire surface depends upon the length of the grain, the ignition temperature of the grain, the initial temperature of the grain, the initial rate of reaction of the grain, the heat of reaction of the grain, etc. This time will, therefore, vary from a few milliseconds to fifty or more milliseconds.

This time lapse from the application of the firing current to development of full thrust represents a serious problem, particularly when the rocket motor powers a missile directed against or by a high-speed aircraft. For example, an aircraft moving at a speed of 1000 miles per hour will travel approximately 1.5 feet every millisecond. A total delay of 50 milliseconds from the time of application to development of thrust will permit travel of about 75 feet, more than enough to cause a miss.

In addition to rockets, solid propellent grains are used in other applications such as a propelling charge for large artillery shells, etc. The same disadvantages are present in such uses.

Accordingly, an object of the present invention is to provide an igniter assembly for firing solid propellent grains wherein the period between application of firing current and development of full surface reaction is minimized. Another object is to provide a means whereby the entire length of the burning surfaces of a rocket grain may be ignited essentially simultaneously. A further object is to provide such igniter in a form simple to fabricate and install. Other objects will become apparent as this invention is more fully described.

We have found that the foregoing objects may be achieved when we use as an igniter for a solid propellent grain an assembly comprising a length of explosive connecting cord having a core of from 0.5 to 5 grains per foot of a high velocity detonating explosive within a metal sheath, said connecting cord being centrally disposed within a mass of an incendiary mixture. The mass of the incendiary mixture will always have one dimension of greater magnitude than any other, and the connecting cord will be in alignment with this dimension of greatest magnitude. Usually, the mass of incendiary mixture will be in the form of a cylinder of greater length than diameter and the cord will be concentrically disposed within the cylindrical mass. In other cases, the mass of incendiary mixture will be in the form of a disk and the cord will be spirally positioned in the disk. Both ends or only one end of the connecting cord may terminate within the mass of incendiary mixture.

In order to more adequately describe the present invention, reference is now made to the accompanying drawings in which:

FIGURE 1 represents schematically a typical rocket motor assembly including an embodiment of the present invention;

FIGURES 2 to 5 inclusive illustrate various types of grain configurations in common use;

FIGURE 6 illustrates a prepackaged mass of incendiary mixture; and

FIGURE 7 illustrates a length of connecting cord as used in the present invention.

Referring now to the figures in greater detail, in FIGURE 1, 1 represents the rocket motor casing which is tubular in configuration and has one end closed and the other end forming a nozzle 1A. Within the casing 1 is the propellent grain 2 having a central cavity throughout its entire length. This much of the rocket motor system is conventional. Disposed within the cavity in the grain 2 is the igniter of this invention, i.e., a mass of incendiary mixture 3 surrounding a length of explosive connecting cord 4. In initiating arrangement with one end of the cord 4 is the electric blasting cap 5, and leading from cap 5 are the leg wires 6.

FIGURES 2 to 5 inclusive show various conventional configurations of the propellent grain in unrestricted solid propellent systems. FIGURE 2 shows an internal-burning grain 2 having a central cylindrical cavity. FIGURE 3 shows an internal-burning grain 2 having a longitudinal cavity in the form of a cross. FIGURE 4 shows an internal-burning grain 2 having a longitudinal cavity in the form of a six-pointed star. FIGURE 5 shows an external-burning grain 2 wherein the grain 2 is in the form of a cross, thus forming 4 longitudinal external cavities. Other configurations, such as combinations to provide internal-external-burning surfaces are known. Also, the use of a number of long cylinders of propellent powder to form the grain is well known. All of the configurations have one point in common: increased surface area of the grain is made available for burning.

As previously indicated, present practice is to install the igniter at the end of the grain opposite the nozzle, and ignite that end surface first, the remainder of the surfaces being ignited by the flame and heated gas sweeping over them in the direction of the nozzle. Inasmuch as the usual igniter compositions burn at a velocity equal to or less than the velocity at which the gases and flame flow toward the nozzle, no advantage is gained by extending the igniter into the cavity or cavities of the propellent grain.

An igniter of the present invention, on the other hand, will be ignited along its entire length practically in microseconds, inasmuch as the detonating explosive in the connecting cord will propagate the detonation along the cord at the velocity of approximately 6000 meters per second. Thus, for an igniter 2 meters in length, only slightly more than ⅓ of a millisecond will be required for the initiation to travel from one end to the other. An explosive connecting cord, having from 0.5 to 5 grains of the high velocity detonating explosive per foot of length will provide the flash and heat required to ignite the incendiary mixture but will not produce sufficient shock to shatter or distort the propellent grain. The limitations on the quantity of explosive per unit length are critical for the foregoing reasons. The incendiary mixture, being ignited along its entire length will in turn rapidly ignite all of the adjacent surface of the propellent grain. Thus, in a grain such as illustrated in FIGURES 2 or 4, a single cylindrical igniter assembly would be adequate. For a grain configuration such as illustrated in FIGURE 3, a single igniter assembly having either a cylindrical shape or a conforming cross shape could be used. For a grain having a configuration shown in FIGURE 5, four cylindrical- or triangular-shaped igniter assemblies would be preferred.

The igniter assembly may be prepared in a number of ways. For example, an incendiary mixture having a resin binder can be molded into the desired shape, either around a length of explosive connecting cord or containing a central cavity for subsequent insertion of a length of connecting cord. Preferably, however, the type of packaging presently used will be adapted for use in the assembly of this invention. Present practice is to construct an igniter container of screen wire, sheet metal, or plastic, load in the incendiary mixture, insert the initiation means, and hermetically seal the container. The same procedure can be followed to prepare the preferred igniter assembly as illustrated in FIGURE 6, in which 7 represents plastic coated screen wire, 3 represents the incendiary mixture, in this case in the form of prepressed pellets of a powdered aluminum-potassium perchlorate composition, and 8 represents either a length of connecting cord or a lined tunnel through the incendiary mixture 7. This tunnel can be of metal, synthetic polymeric film material in tube form, or paper tubing.

If the igniter is constructed with the connecting cord in place, the connecting cord may consist of only the explosive core and the metal sheathing. If the igniter is prepared for assembly just before use, the connecting cord will preferably be prepared as illustrated in FIGURE 7, in which 11 represents the explosive core, 10 represents the metal sheathing, and 9 represents strengthening countering, for example, of textile or synthetic polymeric composition. Suitable explosive compositions for use in the core of the connecting cord are the more sensitive primary detonating explosives, preferably pentaerythritol tetranitrate or lead azide. Less sensitive detonating secondary explosives, such as trinitrotoluene, will not reliably propagate detonation in cores of less than about 5 grain per foot of length. The metal sheathing may be of any of the ductile metals or metal alloys. This sheathing will be disintegrated when the cord is detonated.

As used throughout this description, the term incendiary mixture refers to compositions which are readily ignitable and burn with the production of heat sufficient to ignite the adjacent propellent grain. Preferably, the incendiary mixture will liberate at least 1000 calories per gram on burning. Another critical consideration is that the incendiary composition must burn at a rate which is adequately low in order to avoid overly rapid development of high-pressure within the propellent grain which would result in fracturing of the grain and, thus, complete inoperability of the rocket. Naturally, then, compositions which would detonate from the stimulus of the connecting cord if initiated, such as pentaerythritol tetranitrate, trinitrotoluene, dynamite, and the like, are inherently unsuitable for the incendiary composition and will under no circumstances be present. The mixture will consist of a fuel, usually a finely divided metal, and a solid oxidizing agent, usually a chlorate or perchlorate salt. Typical incendiary mixtures are aluminum, or boron, or magnesium mixed with potassium perchlorate or potassium chlorate. The aluminum-potassium perchlorate composition represents a preferred incendiary mixture. Binders may be present to permit forming the mixture into coherent forms.

The igniters of the present invention are initiated by a detonator butting against an end of the connecting cord. The detonator may be positioned near or in the igniter as shown in FIGURE 1, the electrical initiation means then extending from the rocket motor to the firing switch, or the connecting cord may extend out through the rocket motor and be initiated at a point some distance from the motor. The high velocity of propagation of detonation and the lack of a damaging brisance makes this latter feature feasible. The advantages are that reduced exposure of electrical conductors is very desirable to avoid the risk of accidental initiation due to stray electricity or induced currents. The high functioning rate of electric detonators, as compared to the much slower acting squibs, affords additional reduction in elapsed time from the instant of application of the firing current until the full thrust of the motor is obtained. Because of the high precision of propellent grain ignition thus obtained, the igniter assembly of this invention permits greater synchronization when a number of rockets are fired either simultaneously or in some prescribed sequence. If very short delay between rockets fired in sequence is desired, very precise intervals may be obtained by using different lengths of connecting cord from a central initiation source to the individual rocket motors. Knowing the velocity of detonation of the connecting cord, adjustment of lengths to provide the proper sequence and timing is very simple.

While the present invention has its greatest application to the ignition of unrestricted propellent grains, the very rapid ignition of the incendiary mixture obtained with the present assembly makes the igniter useful for igniting restricted grains ("cigarette-burning" grains). In such application, the igniter will be in the form of a disk and the explosive core will preferably spiral within the incendiary mixture in such manner as to provide substantially simultaneous ignition at all points.

The rapidity of ignition by an igniter prepared in accordance with this invention is illustrated in the following table. In carrying out the trials, a metal shell containing the incendiary mixture pressed at 200 pounds per square inch and a length of connecting cord containing 2 grains per foot of PETN in a lead sheath having an outer diameter of 0.092 inch was suspended in a ¾ inch diameter pipe containing 7.5 grams of black powder. A six-inch length of the connecting cord extended beyond the shell, and a commercial electric detonator was used to initiate the connecting cord. Average functioning time for the detonator alone was approximately 3.5 milliseconds from application of current until rupture of the detonator shell. The ignition time for the black powder was recorded as the interval from application of firing current to the detonator to the record of the flash from the black powder as produced by a standard photocell. The times given are the average of three trials.

*Table I*

| Incendiary mixture | Amount (grains) | Shell Wall (in.) | Shell Material | Ignition Time (milliseconds) |
|---|---|---|---|---|
| Mg/BaO$_2$/Se(30/35/35) | 7.0 | 0.010 | Aluminum | 3.81 |
| Mg/KClO$_4$(65/35) | 5.0 | 0.010 | do | 4.52 |
| Al/KClO$_4$(65/35) | 7.0 | 0.014 | Bronze | 4.42 |
| B/Pb$_3$O$_4$(2/98) | 16.0 | 0.014 | do | 3.83 |

The foregoing times show that the ignition time was governed primarily by the functioning time of the detonator. Special detonators having functioning times of 1 to 4 microseconds are known and can be used. The great rapidity with which ignition occurred indicates that the incendiary mixture is set on fire probably by the impact of particles from the metal sheath of the cord rather than as a result of being heated above the ignition temperature. However, regardless of the mechanism of initiation, ignition and burning rather than initiation and detonation results, and the hot particles of the incendiary mixture in turn ignite the propellent grain.

Many other advantages and adaptations of the igniter assembly of the present invention will be obvious to those skilled in the art. Accordingly, we intend to be limited only by the following claims.

We claim:

1. A combination of an elongated tubular propellant grain having a cavity extending substantially the length of said grain and disposed within and extending substantially the length of said cavity an igniter adapted to effect ignition of the entire exposed surface of the grain in such cavity with extreme rapidity, which igniter comprises a continuous column consisting essentially of a substantially cylindrical mass of an incendiary mixture of a metal fuel and an inorganic oxidizing salt, and a length of explosive connecting cord disposed within, and extending substantially the length of said mixture, said connecting cord having a core of from 0.5 to 5 grains per foot of a high velocity detonating explosive within a sheath of a ductile metal.

2. An igniter assembly as claimed in claim 1, wherein said mass of incendiary mixture is within a rigid container.

3. An igniter assembly as claimed in claim 1, wherein said mass is composed of a pelleted incendiary mixture.

4. An assembly as claimed in claim 1, wherein the said metal fuel is aluminum and wherein the inorganic salt is potassium perchlorate.

5. An assembly as claimed in claim 1, wherein the explosive in said connecting cord is pentaerythritol tetranitrate.

6. An assembly as claimed in claim 1, wherein only one end of said connecting cord terminates within said mass.

References Cited in the file of this patent

UNITED STATES PATENTS

| | | |
|---|---|---|
| 868,876 | Lheure | Oct. 22, 1907 |
| 1,440,175 | Riabouchinski | Dec. 26, 1922 |
| 2,697,325 | Spaulding | Dec. 21, 1954 |
| 2,704,437 | Thomsen | Mar. 22, 1955 |
| 2,743,580 | Loeb | May 1, 1956 |
| 2,775,200 | Guenter | Dec. 25, 1956 |
| 2,913,982 | Hayes | Nov. 24, 1959 |